United States Patent [19]
Goolsby et al.

[11] Patent Number: 5,985,134
[45] Date of Patent: Nov. 16, 1999

[54] STARTUP OF MAGNETIC SEPARATION PROCESS IN AN FCC UNIT

[75] Inventors: Terry L. Goolsby, Katy, Tex.; Howard F. Moore, Catlettsburg, Ky.

[73] Assignee: M.W. Kellogg Company, Houston, Tex.

[21] Appl. No.: 09/022,607

[22] Filed: Feb. 12, 1998

Related U.S. Application Data

[60] Provisional application No. 60/037,686, Feb. 12, 1997, provisional application No. 60/037,687, Feb. 12, 1997, provisional application No. 60/037,688, Feb. 12, 1997, and provisional application No. 60/037,818, Feb. 12, 1997.

[51] Int. Cl.$^6$ .................................................. C10G 11/18
[52] U.S. Cl. ...................... 208/154; 208/52 CT; 208/111; 208/120; 208/108; 208/113; 208/118; 209/8; 209/38
[58] Field of Search ............................. 208/52 CT, 154, 208/111, 120, 113, 118; 209/8, 38

[56] References Cited

U.S. PATENT DOCUMENTS

| | | |
|---|---|---|
| Re. 31,439 | 11/1983 | Rosensweig . |
| Re. 35,046 | 10/1995 | Hettinger, Jr. et al. . |
| 3,711,422 | 1/1973 | Johnson et al. . |
| 4,359,379 | 11/1982 | Ushio et al. . |
| 4,406,773 | 9/1983 | Hettinger, Jr. et al. . |
| 4,482,450 | 11/1984 | Ushio et al. . |
| 4,727,823 | 3/1988 | Thompson et al. . |
| 4,823,102 | 4/1989 | Cherian et al. . |
| 4,882,043 | 11/1989 | Jung . |
| 5,147,527 | 9/1992 | Hettinger . |
| 5,171,424 | 12/1992 | Hettinger . |
| 5,190,635 | 3/1993 | Hettinger . |
| 5,198,098 | 3/1993 | Hettinger, Jr. . |
| 5,230,869 | 7/1993 | Hettinger et al. . |
| 5,250,482 | 10/1993 | Doctor . |
| 5,328,594 | 7/1994 | Hettinger . |
| 5,364,827 | 11/1994 | Hettinger et al. . |
| 5,393,412 | 2/1995 | Hettinger . |
| 5,448,803 | 9/1995 | Morell . |
| 5,538,624 | 7/1996 | Hettinger . |

*Primary Examiner*—Helane Myers
*Attorney, Agent, or Firm*—The M.W. Kellogg Company

[57] ABSTRACT

A startup method for a fluidized catalytic cracking (FCC) unit operating with a magnetic catalyst separation means is disclosed. Magnetic strength, or separation severity, is maintained or increased until most of the catalyst has passed through the magnetic separation unit. After this point, magnetic flux and/or centrifugal forces, are decreased for lined-out operation. Preferably a MagnaCat® catalyst separation unit is used for magnetic fractionation of catalyst.

6 Claims, 2 Drawing Sheets

5,985,134

STARTUP OF MAGNETIC SEPARATION PROCESS IN AN FCC UNIT

CROSS-REFERENCE TO RELATED APPLICATIONS

This application claims the benefit under 35 USC §119(e) of provisional U.S. Ser. Nos. 60/037,686, 60/037,687, 60/037,688, and 60/037,818, all filed Feb. 12, 1997, and all of which are incorporated by reference herein.

FIELD OF THE INVENTION

The present invention relates to fluidized catalytic cracking (FCC) and magnetic separation of FCC catalyst, and more particularly to a method of starting up the magnetic separation process.

BACKGROUND OF THE INVENTION

The process for magnetic separation of catalyst from a fluidized catalytic cracking or similar unit was recently commercialized. The magnetic separation process is described in one or more of U.S. Pat. No. 4,406,773 to Hettinger, Jr. et al.; U.S. Pat. No. Re. 35,046 to Hettinger, Jr. et al.; U.S. Pat. Nos. 5,147,527 to Hettinger, Jr. et al.; 5,171,424 to Hettinger; 5,190,635 to Hettinger; 5,198,098 to Hettinger, Jr.; 5,230,869 to Hettinger et al.; 5,328,594 to Hettinger; 5,364,827 to Hettinger et al.; 5,393,412 to Hettinger; and 5,538,624 to Hettinger; all of which are hereby incorporated by reference.

SUMMARY OF THE INVENTION

During our commercial test of this technology, we soon realized that operation of the process was not as simple as we thought it would be. We learned it is not possible to simply subject the catalyst to a constant magnetic flux and belt speed and obtain consistent catalyst rejection. This works fine in the lab. Such an approach will magnetically fractionate or resolve an equilibrium catalyst (ECat) mixture into higher and lower magnetic susceptibility fractions, but it will be far from optimum, and the amount of catalyst rejected will change drastically in a commercial unit. As an example, we started up a unit with constant modifications and changes to solve various problems that came up. We would think we had everything worked out, and then come back to the unit a few weeks or a month later and find that it was rejecting most of the catalyst. During startup, when engineers were in constant attendance, magnetic field strength, belt velocity, etc. were set up to reject the 10 to 30 weight percent of the catalyst with the highest metals levels. Within a month or two, these same conditions could reject 80 weight percent of the ECat. Use of the magnetic separator appeared to change the magnetic properties of the catalyst. We at last devised a way to provide a smooth startup for the unit.

Accordingly, the present invention provides a startup procedure for magnetic separation of catalyst in a process for fluidized catalytic cracking (FCC) of a hydrocarbon feed by contact with a circulating catalyst inventory to lighter products. The process includes installing a magnetic separator to process a portion of catalyst inventory circulating in an FCC unit equipped to mix a metal-containing, crackable hydrocarbon feed with a source of hot regenerated catalyst in a cracking reaction zone to produce a mixture of spent, metal-contaminated, catalyst and cracked products, separate the spent catalyst from the cracked products, remove the cracked products from the process, strip the spent catalyst in a catalyst stripping zone by contact with stripping vapor to remove strippable hydrocarbons from the spent catalyst and produce stripped catalyst, and regenerate the stripped catalyst in a catalyst regenerator at catalyst regeneration conditions by contact with oxygen or an oxygen-containing gas to produce metals-contaminated regenerated catalyst which is recycled to the cracking reaction zone. To start up the magnetic separation, our procedure involves at least periodically removing from 5 to 40 weight percent of the catalyst inventory per day and charging same to the magnetic catalyst separator, magnetically separating removed catalyst for 5 to 60 days at an initial or transition magnetic flux severity to produce a high-metals reject fraction comprising from 10 to 50 weight percent of the removed catalyst and a recycle fraction comprising from 50 to 90 weight percent of the removed catalyst, and recycling the recycle fraction to the FCC unit, and thereafter, reducing a magnetic field strength and/or increasing an inertial force opposing the magnetic field strength in the magnetic separator by at least 25%, as compared to the magnetic field strength and/or opposing inertial force during the initial or transition period.

In another embodiment, the present invention provides an improvement in an FCC process. The improvement comprises removing from 1 to 20 weight percent of the catalyst inventory per day, preferably from 2 to 10 weight percenct, and charging same to a magnetic separator using a magnetic field and opposing inertial force to separate the removed catalyst into fractions. During a startup period the removed fraction is magnetically separated to produce a high-metals reject fraction comprising from 10 to 50 weight percent of the removed fraction, and a lower metals content recycle fraction comprising from 50 to 90 weight percent of the removed fraction. The recycle fraction is recycled to the FCC process. The startup operation is continued for 10 to 60 days, and then the operation of the magnetic separator is modified to increase the magnetic field strength or reduce inertial forces opposing the magnetic field strength, by at least 25% to reduce the magnetic susceptibility of the catalyst reject fraction. This keeps the reject rate high enough to continue rejecting a desired fraction of the catalyst after the more magnetic fraction has been withdrawn during the startup period.

In yet another embodiment in an FCC process, the improvement comprises a three-phase startup procedure, continuously removing from 1 to 20 weight percent of the catalyst inventory per day, preferably from 2 to 10 weight percent, and charging same to a magnetic separation process to produce a removed fraction and a recycle fraction. During an initial startup period, the removed fraction is magnetically separated to produce a high-metals reject fraction comprising from 10 to 50 weight percent of the removed fraction, and recycling the recycle fraction to the FCC unit. The initial startup operation is continued from 10 to 60 days. During a transition phase, the operation of the magnetic separator is changed to increase the magnetic field strength, or reduce an inertial force opposing the magnetic field strength, by at least 25% to reduce the magnetic susceptibility of the reject catalyst fraction. The transition phase is continued for 1 to 12 months, and during steady state operation, magnetic flux is reduced and/or opposing inertial force increased by at least 25% as compared to the initial startup to limit rejection of catalyst.

DESCRIPTION OF THE PREFERRED EMBODIMENTS

Figure 1:
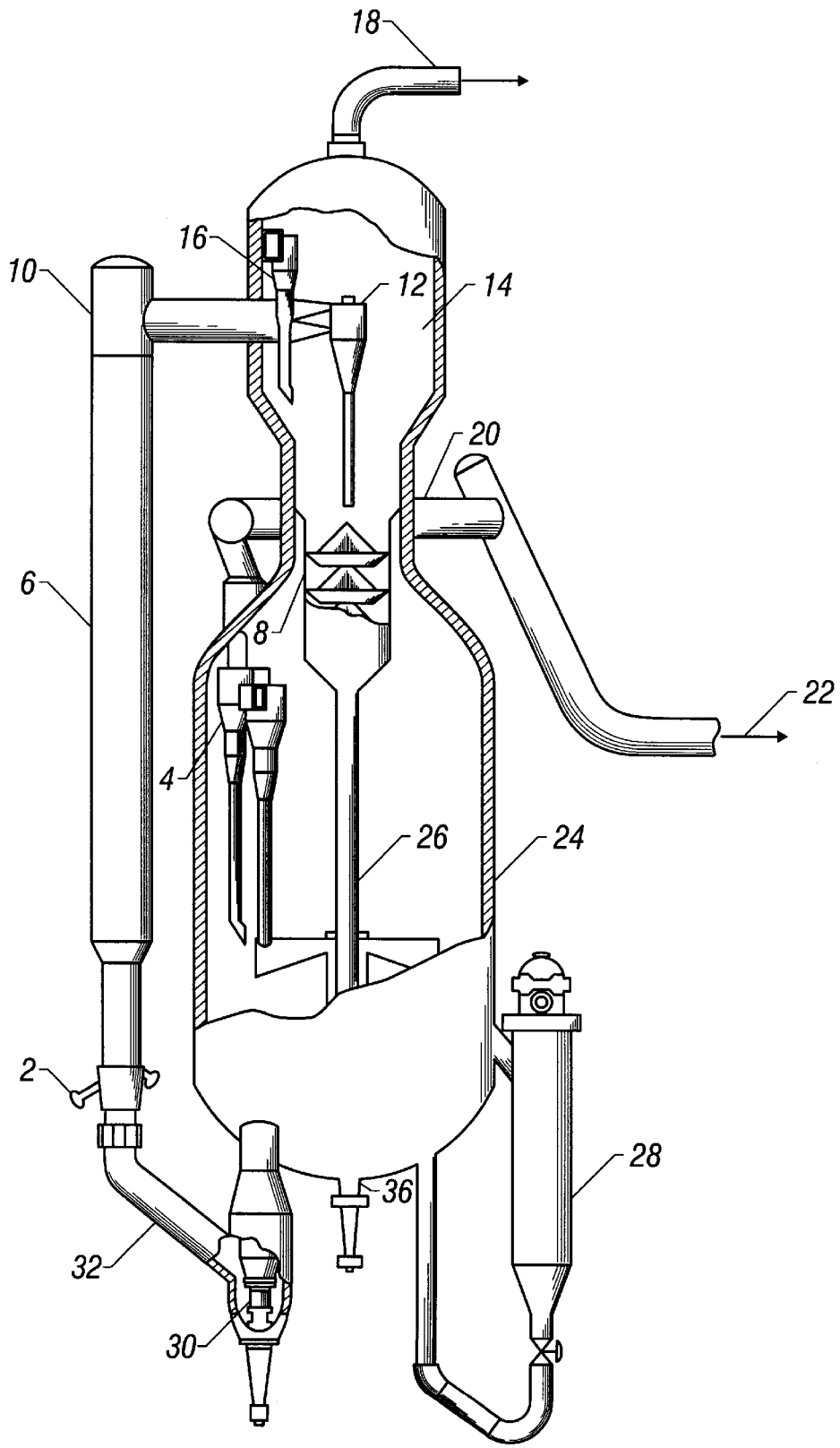
FIG. 1 is a prior art simplified schematic diagram of an FCC unit.

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of The Oil & Gas Journal.

A heavy feed such as a gas oil or vacuum gas oil is added to riser reactor 6 via feed injection nozzles 2. The cracking reaction is completed in the riser reactor which takes a 90° turn at the top of the reactor at elbow 10. Spent catalyst and cracked products discharged from the riser reactor 6 pass through riser cyclones 12 which efficiently separate most of the spent catalyst from cracked product. Cracked product is discharged into disengager 14, and eventually is removed via upper cyclones 16 and conduit 18 to the fractionator (not shown).

Spent catalyst is discharged down from a dipleg of riser cyclones 12 into catalyst stripper 8, where one or preferably two or more stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator 24, if desired. Regenerated catalyst is withdrawn from the regenerator 24 via regenerator catalyst plug valve assembly 30 and discharged via lateral 32 into the base of the riser reactor 6 to contact and crack fresh feed injected via injectors 2, as previously discussed. Flue gas, and some entrained catalyst, are discharged from the regenerator 24 into a dilute phase region in the upper portion of regenerator 24. Entrained catalyst is separated from flue gas in multiple stages of cyclones 4, and discharged via outlets 8 into plenum 20 for discharge to a flare (not shown) via line 22.

Figure 2:
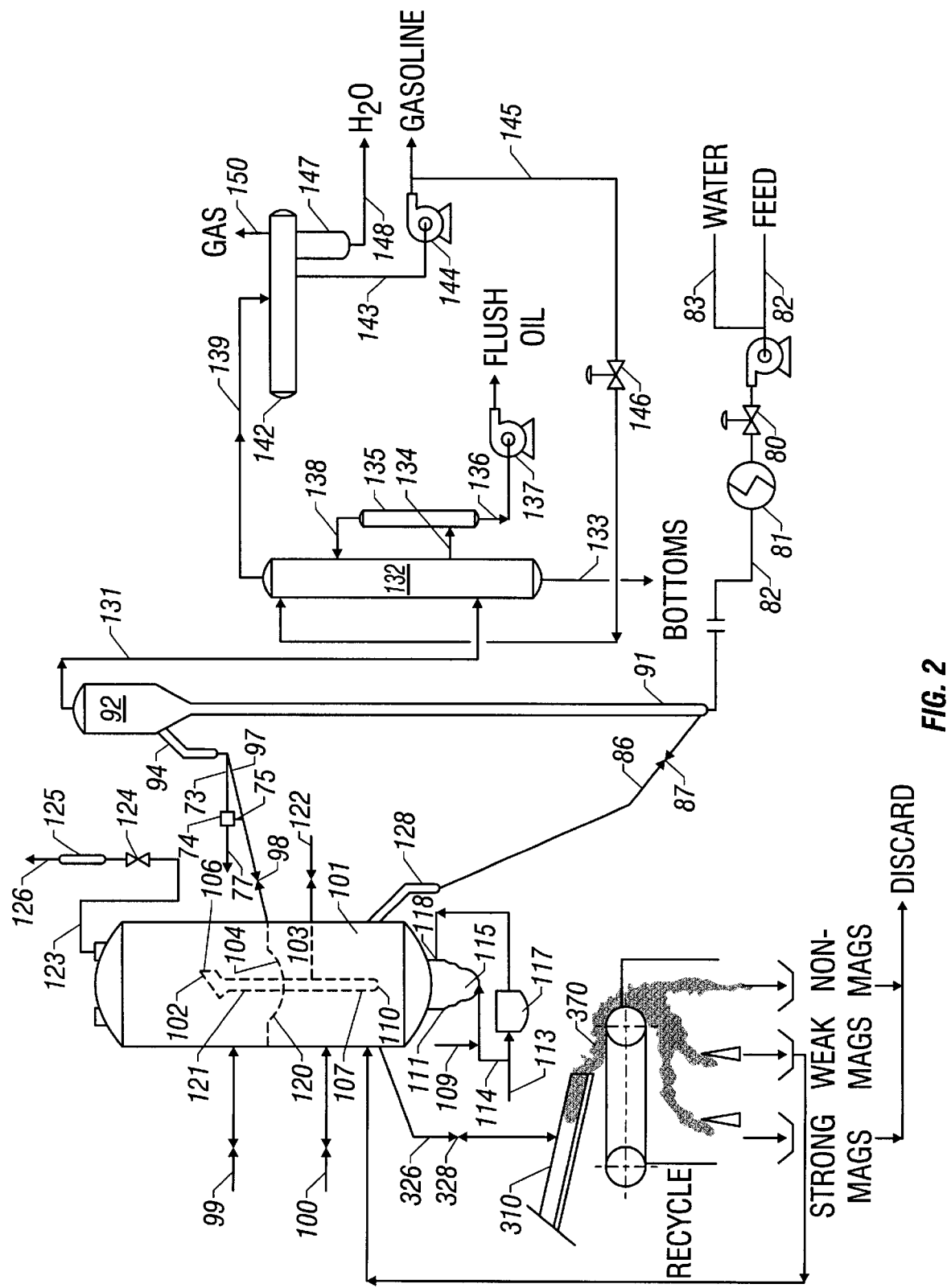
FIG. 2 is a prior art simplified schematic diagram of an FCC unit plus a magnetic catalyst separation unit, taken from FIG. 2 of U.S. Pat. No. 5,147,527.

In FIG. 2, reference numeral 80 identifies a feed control valve in feedstock supply pipe 82. Supply pipe 83 (when used) introduces liquid water and/or an additive solution into the feed. Heat exchanger 81 in supply pipe 82 acts as a feed preheater, whereby preheated feed material may be delivered to the bottom of a riser type reactor 91. Catalyst is delivered to the reactor through catalyst standpipe 86, the flow of catalyst being regulated by a control valve 87 and suitable automatic control equipment (not shown).

The reactor is equipped with a disengagement vessel 92. Catalyst departs disengagement vessel 92 through stripper 94. Spent catalyst passes from stripper 94 to regenerator 101 via spent catalyst transfer pipe 97 having a slide valve 98 for controlling flow.

A sidestream of catalyst is passed to distributor 310 through line 326. That portion passing through the magnetic field (weak mags) is returned to line 97 through a line not shown in the figure.

Regenerator 101 is divided into upper chamber 102 and lower chamber 103 by a divider panel 104 intermediate the upper and lower ends of the regenerator vessel. The spent catalyst from transfer pipe 97 enters upper chamber 102 and delivers it, via drop leg 107 having an outlet 110, beneath the upper surface of the dense phase of catalyst in lower chamber 103. Valve means in such external drop leg 107 can control the residence time and flow rate in and between the upper and lower chambers 102,103. Make up catalyst and/or catalyst or regenerator additives may be added to the upper chamber 102 and/or lower chamber 103 through addition lines 99 and 100 respectively.

Air is supplied to the regenerator through an air supply pipe 113. A portion of the air travels through a branch supply pipe 114 to bayonet 115 which extends upwardly into the interior of plenum 111 along its central axis. Catalyst in chamber 103 has access to the space within plenum 111 between its walls and bayonet 115. A smaller bayonet (not shown) in the aforementioned space fluffs the catalyst and urges it upwardly toward a horizontally arranged ring distributor (not shown) adjacent the open top of plenum 111 where it opens into chamber 103. The remainder of the air passing through air supply pipe 113 may be heated in air heater 117 and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop let 107. The amount of air supplied is sufficient so that the resultant combustion gases are still able to support combustion upon reaching the top of chamber 103 and entering chamber 102. Drop leg 107 extends through an enlarged aperture in panel 104, to which is secured a gas distributor 120 which is concentric with and surrounds the drop leg 107. Combustion supporting gases from chamber 103, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102 through a supply pipe 122, which may also discharge through gas distributor 120.

Fully regenerated catalyst is discharged from lower, regenerator chamber 103 through regenerated catalyst stripper 128, whose outlet feeds into catalyst standpipe 86. Thus, regenerated catalyst is returned to riser 91 for contact with additional fresh feed. The division of the regenerator into upper and lower regeneration chambers 102 and 103 not only smoothes out variations in catalyst regenerator residence time but is also uniquely of assistance in restricting the quantity of regeneration heat which is imparted to the fresh feed while yielding a regenerated catalyst with low levels of coke for return to the riser 91.

Because of the arrangement of the regenerator 101, coked catalyst from transfer line 97, with a relatively high loading of carbon, contacts combustion supporting gases in chamber 102 which have already been at least partially depleted of oxygen by the burning of carbon from partially regenerated catalyst in lower chamber 102. Because of this, it is possible to control both the combustion of carbon and the quantity of carbon dioxide produced in upper regeneration chamber 102. Although regenerating gas introduced through air supply pipe 113 and branch conduit 114 may contain relatively large quantities of oxygen, the partially regenerated catalyst which is contracted in lower chamber 103 has already had a major portion of its carbon removed. The high oxygen concentration and temperature in chamber 103 combine to rapidly remove the remaining carbon in the catalyst, thereby achieving a clean, regenerated catalyst with a minimum of heat release. The regeneration off gases are discharged from upper chamber 102 via gas pipe 123, regulator valve 124, catalyst fines trap 125 and outlet 126.

The vapor products from disengagement vessel 92 may be processed in any convenient manner such as by discharge through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to an overhead receiver 142 having a bottom line 143 feeding into pump 144 for discharging gasoline product. A portion of this product may be returned to the fractionator via recirculation line 145, the flow being controlled by valve 146. The receiver 142 also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and heavier material in the gas stream may be separated by compression, cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gas readily passes into zone 102. However, the perforations are sized so that the pressure difference between the upper and lower zones prevents catalyst particles from passing downwardly through the distributor 120. The bayonet 115 and distributor 120 are similarly sized. Gases exiting the regenerator 102 comprise combustion products, nitrogen, steam formed by combustion reactions and/or from vaporizing water added to the regenerator, and oxides of sulfur and other trace elements. These gases are separated from suspended catalyst particles by a cyclone separator (not shown) and then pass out of the regenerator through discharge conduit 123. While this invention may be used with single stage regenerators, or with multiple stage regenerators which have basically concurrent instead of countercurrent flow between combustion gases and catalyst, it is especially useful in regenerators of the types shown in FIGS. 1 and 2, which have countercurrent flow.

Although we prefer the use of the MagnaCat® magnetic separation process, available from the MW Kellogg Technology Company, it is possible to practice this process using other magnetic separation technology.

We prefer MagnaCat® magnetic catalyst separation, involving dumping equilibrium catalyst (ECat), cooled to 100°–500° F., on a belt or rotating drum containing magnets and using a combination of magnetic and centrifugal forces to fractionate the ECat mixture. It is also possible to achieve magnetic fractionation of ECat by subjecting it to magnetic forces in flowing liquid or gaseous streams, or by processing in a super-cooled, quadrupole, super-conducting magnetic field, though not necessarily with equivalent results.

A 3 inch or 4 inch stacked magnet rare earth roller magnetic separator (RERMS) is preferably used with the radial magnets stacked in bucking configuration, i.e. NN SS NN, etc.

The catalyst is preferably dumped or vibrated onto a 5 or 10 mil KEVLAR belt passing over the 3 or 4 inch RERMS magnet. At startup fairly high belt velocities of about 300–350 fpm may be decreased to 110 fpm, and eventually increased after a few more months of operation to 150–300 fpm.

In many units iron content, and/or nickel and vanadium content, varies seasonally with the amount of heavy material fed to the cracker. It is beneficial to at least periodically analyze the feedstock for metal content, and adjust operation of the magnetic separation unit accordingly so that a relatively constant amount of material is rejected. The magnetic separation unit is itself a fairly good indicator of metals level, and belt speed can be adjusted as needed to maintain the desired ratio of reject/recycled catalyst.

The magnetic separation means, per se, forms no part of the present invention.

The first time magnetic catalyst separation is used on an FCC unit, it faces a formidable job in resolving a mixture of billions of catalyst particles, some of which have been in the FCC unit for days and some of which may have been in the unit for months or even years.

We have found that for optimum operation it is important to commission the unit following a two or sometimes three-phase procedure: I—Startup, II—Transition, III—Steady State. Sometimes startup and transition are merged, but there is always a final stage, or steady state which is different.

Initially during startup, it is best to start slowly, with a low magnetic flux and/or high opposing inertial force (i.e. a high belt speed), so that only the most aged, most severely metal-contaminated material is rejected in the magnetic separation unit.

For a typical FCC unit, with a catalyst inventory of 100–250 tons, and a magnetic separation unit processing 10–50 tons/day of catalyst, from 5 to 20 weight percent of the catalyst inventory might be processed in any 24-hour period. Low magnetic flux and/or high inertial force separation conditions may be maintained for an initial period of operation, typically 1 to 6 weeks.

Ideally, low-flux magnetic separation is determined according to the formula:

$$Days_{lf} = X/(\text{MagnaCat® daily capacity/ECat inventory})$$

Where $Days_{lf}$=the number of days during which relatively low magnetic flux operation should be maintained.

X=0.5–5.

MagnaCat® daily capacity=tons/day processed in the magnetic separation unit.

ECat inventory=total inventory of ECat in the FCC unit, in tons.

After the startup period, when the unit has lined out and is running smoothly, it is time to change things. It is usually best to increase the magnetic flux strength and/or reduce the belt speed within thirty days of startup, and certainly within 30 days of the end of startup.

During Phase I—Startup, the catalyst which has been in the unit for months and potentially even years is largely but not completely eliminated by magnetic catalyst separation. In Phase II—Transition, it is time to re-tune the unit. Now the most metal-contaminated catalyst is material produced in situ from moderately contaminated ECat.

The transition period is highly sensitive to local conditions, metals in feed, amount of catalyst replacement needed to maintain activity, efficiency of the magnetic catalyst separation unit per pass and the amount of catalyst inventory processed each day through the magnetic separation unit.

Some refiners may simply double their initial flux strength after a 30-day startup period, and achieve satisfactory results, at least during the transition period.

Some refiners may combine startup/transition and run at one separation intensity.

A refiner who had been through Phase I (startup), and Phase II (transition), or a combined Phase I/II, might think that all problems with the unit were solved and operation could return to normal. Operators and engineers could merely check once a day to see that the unit was still turned on. That is what we thought, until we learned that this scenario could create conditions which rejected most of the catalyst from the unit. Phrased another way, everything could be running smoothly, but after a month or two most of the catalyst can be rejected as too magnetic.

We do not know for sure what caused this behavior. The magnets did not strengthen with age. We suspect that magnetic processing of the catalyst changed the properties of the catalyst. A piece of non-magnetic steel, such as a screwdriver or nail, can be made magnetic by sliding it on another magnet. The magnetization of the catalyst may have changed the response of the catalyst to the magnetic separation unit.

We overcame this problem by increasing the belt velocity over the permanent magnet by at least 25%. Alternatively, the magnetic flux could have been reduced, for example, by changing to a weaker magnetic roller and/or a thicker belt with similar results. In terms of catalyst rejection, this limited the amount rejected to a maximum of 20 weight percent per pass.

At startup, relatively low magnetic field strength and/or high belt speed is used to reject only the most metal contaminated fraction of the circulating catalyst. Even at low flux, high belt speed condition, at least 20 percent of the magnetically processed catalyst will be rejected, preferably at least 30%.

After the most magnetic catalyst has been rejected during the startup phase, there is often a transition phase before steady state can be achieved. During this transition phase, the magnetic flux is increased and/or the belt speed is reduced in an effort to reject less magnetically susceptible catalyst that now represents the oldest catalyst in the system. Even with the increased flux and/or reduced belt speed, it may not be possible for the magnetic rejection rate to keep up with the previous fresh catalyst addition rate. Thus, it is preferable to reduce the catalyst addition rate during the transition period to avoid exceeding the catalyst holdup capacity. As the transition period progresses, however, steady state is not always rapidly achieved. This is because the metals accumulate on the recycle catalyst and the catalyst becomes more magnetic as it is constantly processed with a metal-containing feedstock.

After operation of the FCC unit with magnetic separation during startup and any transition phase, the FCC unit ideally reaches a steady state wherein the rate of fresh (virgin) catalyst addition matches catalyst losses from fines losses in the flue gases and losses due to the magnetic separator rejection of the high metal fraction. The rate of fresh catalyst addition and matching magnetic separator rejection are preferably manipulated to achieve optimum gasoline conversion. The optimum gasoline conversion is not always the highest conversion possible due to the possibility that downstream facilities may not be able to process the additional conversion, i.e. there may be downstream bottlenecks which prevent operation at the highest possible gasoline conversion rate. In general, the fresh (virgin) catalyst is preferably added at a rate of from 1 to 20 percent per day of the circulating ECat inventory, more preferably from 2.5 to 10 percent per day. At steady state conditions with magnetic separation, this can be from 5 to 40 percent less virgin catalyst supplied to the FCC unit than without magnetic separation, more typically from 20 to 30 percent less fresh catalyst is needed than without magnetic separation.

Because the magnetic separation unit is extremely sensitive to feed metals levels, rather than inherent catalyst activity, operation of the unit must be carefully controlled for optimum results. If during an extended period of operation an iron rich feed is processed (e.g. the heavy ends of crude fraction are contaminated with soluble or extremely finely dispersed iron compounds) it is possible for the catalyst to have a dramatic increase in magnetic susceptibility. Thus, the unit at startup, which was adjusted to reject only 20 weight percent of the catalyst per pass going through the magnetic separation unit, could reject 80%, 90%, or even more of the catalyst charged to the magnetic separation unit when the feed contained abnormally high iron levels. Just because ECat became more magnetic, due to the addition 1,000 ppm iron to the catalyst did not necessarily make it bad catalyst. The refiners would of course, prefer not to have the iron present, but fairly fresh, iron-contaminated catalyst still has a significant amount of catalyst activity.

While it is possible to constantly monitor the hydrocarbon feed for metals content, or to monitor ECat metals content, to be used as a means of feed forward control to adjust the operation of the magnetic operation unit, we have found a simple and direct feed-back method which will almost always give optimum results.

First, we determined what percentage of the magnetically processed catalyst, in terms of weight fraction, would be the optimum reject fraction. If the refiner determines that 20 weight percent per pass of catalyst going through the magnetic separation unit is the optimum amount to reject from the unit, then the refiner can adjust the operation of the magnetic separation unit as needed to maintain 4:1 recycle:reject ratio. This can be done by measuring opacity of one or both of the reject/recycle streams, weighing the hoppers, using some form of inertial flow measuring device, or even more simply installing capacitance probes in bins used to receive reject and/or recycle fractions. Capacitance probes are well-known, widely used, highly reliable, and inexpensive. The operator may install a counter on capacitance probes associated with the various catalyst collection hoppers, and use the number of counts in the volume of each container to determine the ratio of recycle/reject. It is also possible, and highly desirable to use this volumetric measure of reject/recycle catalyst as input to a computer control system. Analog controllers and the like may also be used to derive a control signal for the magnetic separation unit based on the weight or volumetric ratios of reject/recycle catalyst, or some derivative thereof.

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

We claim:

1. A process for fluidized catalytic cracking (FCC) of a hydrocarbon feed by contact with a circulating catalyst inventory to lighter products comprising the steps of:
   a) installing a magnetic separator to process a portion of catalyst inventory circulating in an FCC unit equipped to (1) mix a metal-containing, crackable hydrocarbon feed with a source of hot regenerated catalyst in a cracking reaction zone to produce a mixture of spent, metal-contaminated catalyst and cracked products, (2)

separate the spent catalyst from the cracked products, (3) remove the cracked products from the process, (4) strip spent catalyst in a catalyst stripping zone by contact with stripping vapor to remove strippable hydrocarbons from the spent catalyst and produce stripped catalyst, and (5) regenerate the stripped catalyst in a catalyst regenerator at catalyst regeneration conditions by contact with oxygen or an oxygen-containing gas to produce metals-contaminated regenerated catalyst which is recycled to the cracking reaction zone;

b) at least periodically removing from 1 to 20 weight percent of the inventory per day and charging same to the magnetic catalyst separator;

c) initially for 5 to 60 days magnetically separating the removed catalyst at an initial or transition magnetic flux severity to produce a high-metals reject fraction comprising from 10 to 50 weight percent of the removed catalyst and a recycle fraction comprising from 50 to 90 weight percent of the removed catalyst, and recycling the recycle fraction to the FCC unit; and thereafter, d) reducing a ratio of a magnetic field strength to an inertial force opposing the magnetic field strength by at least 25%, as compared to the ratio of the magnetic field strength to the opposing inertial force during the initial period.

2. The process of claim 1 wherein magnetic field strength is held constant and centrifugal forces on the catalyst are increased in step (d).

3. The process of claim 1 wherein magnetic field strength, opposing inertial force or a combination thereof are changed by at least 33% relative to the initial or transition period.

4. The process of claim 1 wherein the magnetic field strength, opposing inertial force, or combination thereof are changed in an amount equal to at least a 30% reduction in magnetic field strength as compared to operation within the first 5–10 days of operation of the magnetic separator, and the metals levels of circulating catalyst charged to the magnetic separation unit, and recycled from the recycled magnetic separation unit to the FCC unit, are reduced.

5. In an FCC process comprising operating an FCC unit, the improvement comprising:

a) removing from 1 to 20 weight percent per day of catalyst inventory and charging same to a magnetic separator using a magnetic field and inertial force to separate the removed catalyst into fractions;

b) during an initial startup period magnetically separating the removed fraction to produce:
  1) a high-metals reject fraction comprising from 10 to 50 weight percent of the removed fraction; and
  2) a lower metals content recycle fraction comprising from 50 to 90 weight percent of the removed fraction, and recycling the recycle fraction to the FCC unit;

c) continuing the initial startup period for 10 to 60 days;

d) thereafter changing the operation of the magnetic separator to increase a ratio of the magnetic field strength to the inertial forces opposing said magnetic field strength by at least 25%.

6. In an FCC process process comprising operating an FCC unit, the improvement comprising a three-phase startup procedure comprising:

a) continuously removing from 1 to 20 weight percent per day of catalyst inventory in the unit and charging same to a magnetic separation process to produce a removed fraction;

b) during an initial startup period, magnetically separating the removed fraction to produce a high-metals reject fraction comprising from 10 to 50 weight percent of the removed fraction and a recycle fraction comprising form 50 to 90 weight percent of the removed fraction, and recycling the recycle fraction to the FCC unit, and continuing the initial startup operation from 10 to 60 days to complete the initial startup period;

c) during a transition phase after the initial startup period, changing the operation of the magnetic separator to increase a ratio of the magnetic field strength to the inertial forces opposing the magnetic field strength by at least 25% to reduce the amount of reject catalyst fraction and increase the amount of catalyst recycle fraction, and continuing the transition phase for 1 to 12 months; and d) during a subsequent lined out, steady state operation phase, manipulating fresh catalyst addition to control a gasoline conversion rate and adjusting the magnetic field strength or opposing inertial forces to match catalyst rejection with the catalyst addition to achieve a steady state level of circulating catalyst.

* * * * *